United States Patent Office 3,174,881
Patented Mar. 23, 1965

---

3,174,881
METHOD FOR MAKING POROUS CONTACT MASSES
James E. McEvoy, Morton, and Harold Shalit, Drexel Hill, Pa., assignors, by direct and mesne assignments, of one-half to Air Products and Chemicals, Inc., a corporation of Delaware, and one-half to Northern Natural Gas Company, Omaha, Nebr., a corporation of Delaware
No Drawing. Filed May 31, 1960, Ser. No. 32,598
5 Claims. (Cl. 136—86)

This invention relates to rigid, porous contact masses and to a method for making the same, and is directed particularly to contact masses commonly employed in the chemical processing and electro-chemical arts for contact treatment of gaseous or liquid materials.

The invention has application, for example, to the manufacture of porous supports for catalytic materials, such as the pellets, or granules of catalyst commonly employed in catalytic petroleum refining operations; as a catalytic electrode support or an electrolyte matrix in electro-chemical reactions for the generation of electrical energy, as in a fuel cell, especially one operating at temperatures in excess of 500° C.; and as a filtering medium useful, for example, in the handling of highly alkaline fluids or in the treatment of fluid petroleum products, such as jet fuels, for the purpose of coalescing any entrained water.

The invention may have other applications, especially where there is a need for a contact mass having the characteristics of hardness; high porosity, such as to permit high filter rates with a low pressure drop; high retention efficiency in filtering operations; high structural strength; and low cost of manufacture.

The contact mass may be formed in any known manner, as by extrusion or molding in the shape of pellets, flat sheets, hollow cylindrical bodies, etc. Where the shape of a flat disc or plate is desired, it may be formed first as a thick cylindrical body, as by extrusion, and then be sliced to form circular discs of desired thinness.

In accordance with the method of the invention, the basic starting material in the formulation or manufacture of the contact mass is reagent-grade, raw magnesium oxide powder containing a minimum of silica. A portion of the raw magnesium oxide is fired at a temperature in the range of about 2200–2500° F. for a period of about 10–60 minutes, in order to increase the hardness and particle density.

Pre-fired magnesium oxide, treated as above, is ground to produce a range of powder sizes, such as a 20–60 mesh fraction and a 60–100 mesh fraction, both U.S. Standard. Portions of the 20–60 mesh and the 60–100 mesh fired magnesium oxide, and of the raw unfired magnesium oxide powders are than admixed with diluted nitric acid in a concentration range of 10–70% and in an amount equal to ¼ to 1 times the total weight of magnesia to form an extrudable paste, the diluted nitric acid reacting with the raw magnesium oxide to form a pasty binder for the mixed powder. The mixture is then extruded or molded into the forms desired in the final contact mass product, or into a suitable intermediate form from which the final product may be cut or shaped. The extruded or molded contact masses are first dried at approximately 250° F. and then fired at a temperature in the range of about 1800–2500° F. for a period of about 10–60 minutes.

The particular proportions in which the vari-sized magnesium oxide powders are mixed will of course depend upon the strength and porosity characteristics desired in the final product.

In a typical example embodying the invention and its method of manufacture, raw magnesium oxide powder is fired at 2500° F. and the hardened product of such firing is ground to produce a 20–60 mesh fraction and a 60–100 mesh fraction. Fifteen grams each of the 20–60 fraction, the 60–100 fraction and the raw unfired magnesium oxide powder are mixed with approximately 20 milliliters of diluted nitric acid having a 4 to 1 volume ratio of water to reagent (70% by weight $HNO_3$) nitric acid. This volume ratio constitutes about 18.5% by weight $HNO_3$ in the aqueous acid. The resultant paste was pressed into a thin plate of ⅛" thickness which was first dried to about 250° F. and then fired at about 2000° F. The final contact mass product was a thin plate of considerable strength and hardness having good ceramic properties and a 40–50% pore volume.

By the method of this invention it is possible to produce contact masses of small particulate size suitable as supports for catalytic material to be applied in known manner, as presently practiced, for example, in connection with granular catalyst employed in the catalytic conversion of hydrocarbons.

Catalytic fuel electrodes for use in high temperature fuel cells may comprise thin, circular discs of the hard porous mass, to which may be applied a material suitable to catalyze the oxidation of the fuel, or which may form a matrix to hold the electrolyte for the fuel cell. As stated, the contact mass may be of hollow cylindrical shape, if desired.

For filtering purposes, the contact mass may be extruded or molded in any of the forms or shapes possessed by filters presently available.

Obviously, many modifications and variations of the invention as hereinbefore set forth may be made without departing from the spirit and scope thereof, and therefore only such limitations should be imposed as are indicated in the appended claims.

What is claimed is:
1. The method of making a porous, alkali-resistant contact mass having a relatively high degree of hardness and strength, which comprises the steps of: firing a portion of reagent-grade, raw magnesium oxide powder by heating the same at a temperature in the range of about 2200–2500° F. for about 10–60 minutes; grinding the fired oxide to powder size in the range of about 20–100 mesh, U.S. Standard; admixing the fired, ground and graded oxide powder with another, and relatively substantial, portion of said raw magnesium oxide powder; adding aqueous nitric acid of 10–70 wt. percent concentration to the dry mix in an amount sufficient only to form a readily extrudable and moldable paste, said nitric acid reacting with a portion of the raw magnesium oxide component of said paste to provide an interparticle film of magnesium nitrate as a pasty binder; shaping said paste to the desired contact mass form; drying the shaped contact mass at a temperature of about 250° F.; and firing the dried contact mass at a temperature in the range of about 1800–2500° F. for a period of about 10–60 minutes, therby thermally decomposing said magnesium nitrate binder and sintering the remaining unreacted portion of raw magnesium oxide to impart the desired characteristics of strength, hardness and porosity to said contact mass.

2. The method of claim 1 in which a substantial portion of said ground, pre-fired, magnesium oxide has a particle-size distribution in the range of about 20–60 mesh and the remaining portion has a particle-size distribution in the range of about 60–100 mesh.

3. The method of claim 2 in which said dry mix comprises substantially equal parts by weight of said raw magnesium oxide powder, said 20–60 mesh portion of pre-fired magnesium oxide powder, and said 60–100 mesh portion of pre-fired magnesium oxide powder.

4. The method of claim 1 in which said aqueous nitric acid is added to said dry mix in an amount equal to ¼ to 1 times the weight of the total magnesia.

5. The method of claim 4 in which said aqueous nitric acid contains about 18.5% by weight nitric acid.

References Cited in the file of this patent

UNITED STATES PATENTS

| | | |
|---|---|---|
| 2,636,244 | Williams | Apr. 28, 1953 |
| 2,876,122 | Whittemore | Mar. 3, 1959 |
| 2,913,511 | Grubb | Nov. 17, 1959 |
| 2,914,596 | Gorin | Nov. 24, 1959 |
| 2,947,797 | Justi et al. | Aug. 2, 1960 |
| 2,980,749 | Broers | Apr. 18, 1961 |